United States Patent
van Zelst et al.

(10) Patent No.: US 8,270,517 B2
(45) Date of Patent: Sep. 18, 2012

(54) METHOD AND APPARATUS FOR ORTHOGONAL PILOT TONE MAPPING IN MULTIPLE-IN AND MULTIPLE-OUT (MIMO) AND SPATIAL DIVISION MULTIPLE ACCESS (SDMA) SYSTEMS

(75) Inventors: Albert van Zelst, Woerden (NL); Richard van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 638 days.

(21) Appl. No.: 12/371,366

(22) Filed: Feb. 13, 2009

(65) Prior Publication Data

US 2010/0208834 A1 Aug. 19, 2010

(51) Int. Cl.
*H04B 7/02* (2006.01)
(52) U.S. Cl. ........................................ 375/267
(58) Field of Classification Search ............... 375/260, 375/267
See application file for complete search history.

(56) References Cited

U.S. PATENT DOCUMENTS

| | | | |
|---|---|---|---|
| 7,372,913 B2 | 5/2008 | Van Zelst et al. | |
| 2006/0018394 A1* | 1/2006 | van Zelst et al. | 375/260 |
| 2007/0071147 A1* | 3/2007 | Sampath et al. | 375/347 |
| 2007/0249296 A1* | 10/2007 | Howard et al. | 455/101 |
| 2009/0175366 A1* | 7/2009 | Maltsev et al. | 375/260 |
| 2009/0323850 A1* | 12/2009 | van Nee | 375/267 |
| 2011/0216723 A1* | 9/2011 | Sartori et al. | 370/329 |

OTHER PUBLICATIONS

International Search Report and Written Opinion—PCT/US2010/024067, International Search Authority—European Patent Office—Nov. 8, 2010.

* cited by examiner

*Primary Examiner* — Don N Vo
(74) *Attorney, Agent, or Firm* — Kenyon S. Jenckes

(57) ABSTRACT

Methods and apparatus for orthogonal pilot tone mapping in Multiple-In and Multiple-Out (MIMO) and Spatial Division Multiple Access (SDMA) systems are disclosed. An aspect of the method includes identifying a plurality of symbol periods within which symbols representing encoded data are to be transmitted in a plurality of spatial streams over a communication channel; identifying a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments, and potentially obtain transmit spatial stream diversity benefits, wherein at least two of the pilot tone values in the pilot tone mapping are orthogonal when the symbols are combined over at least one dimension; and transmitting the symbols and the plurality of pilot tones over the plurality of spatial streams for the plurality of symbol periods.

26 Claims, 6 Drawing Sheets

METHOD AND APPARATUS FOR ORTHOGONAL PILOT TONE MAPPING IN MULTIPLE-IN AND MULTIPLE-OUT (MIMO) AND SPATIAL DIVISION MULTIPLE ACCESS (SDMA) SYSTEMS

BACKGROUND

I. Field

The present disclosure relates to wireless transmission in general and in particular to wireless transmissions using multiple spatial streams and pilot tones.

II. Background

In order to address the issue of increasing bandwidth requirements that are demanded for wireless communication systems, different schemes are being developed to allow multiple user terminals to communicate with a single access point by sharing channel resources while achieving high data throughputs. Multiple-Input and Multiple-Output (MIMO) technology represents one such approach that has recently emerged as a popular technique for next generation communication systems. MIMO technology has been adopted in several emerging wireless communications standards, such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Spatial Division Multiple Access (SDMA) is a multiple access scheme that enables multiple streams transmitted to different receivers at the same time to share the same frequency channel and, as a result, provide higher user capacity. SDMA is a common and typical MIMO scheme in cellular wireless systems.

Traditionally, pilot tones are used to assist with transmission and reception. In SDMA systems, pilot tones might be transmitted using multiple transmit spatial streams by cycling through spatial streams. However, spectral flatness becomes an issue and pilot tracking for a particular pilot tone may fail if fading occurs on the spatial stream that happens to be carrying the pilot tone.

SUMMARY

Aspects disclosed herein may be advantageous to Wireless Local Area Network (WLAN) systems employing Multiple-Input, Multiple-Output (MIMO) technology, such as that promulgated by the Institute of Electrical Engineers (IEEE) 802.11 standard, and Spatial Division Multiple Access (SDMA). However, the disclosure is not intended to be limited to such systems, as other applications may benefit from similar advantages.

According to an aspect of the disclosure, a method of wireless communication is provided. More specifically, the wireless communication method includes identifying a plurality of symbol periods within which symbols representing encoded data are to be transmitted in a plurality of spatial streams over a communication channel; identifying a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments and potentially obtain transmit spatial stream diversity benefits, wherein at least two of the pilot tone values in the pilot tone mapping are orthogonal when the symbols are combined over one or more dimensions; and transmitting the symbols and the plurality of pilot tones over the plurality of spatial streams for the plurality of symbol periods.

According to another aspect of the disclosure, a wireless communication apparatus is provided. The wireless communication apparatus includes means for identifying a plurality of symbol periods within which symbols representing encoded data are to be transmitted in a plurality of spatial streams over a communication channel; means for identifying a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments and potentially obtain transmit spatial stream diversity benefits, wherein at least two of the pilot tone values in the pilot tone mapping are orthogonal when the symbols are combined over one or more dimensions; and means for transmitting the symbols and the plurality of pilot tones over the plurality of spatial streams for the plurality of symbol periods.

According to another aspect of the disclosure, an apparatus for wireless communication is provided. The wireless communication apparatus includes a processing system configured to identify a plurality of symbol periods within which symbols representing encoded data are to be transmitted in a plurality of spatial streams over a communication channel; identify a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments and potentially obtain transmit spatial stream diversity benefits, wherein at least two of the pilot tone values in the pilot tone mapping are orthogonal when the symbols are combined over one or more dimensions; and transmit the symbols and the plurality of pilot tones over the plurality of spatial streams for the plurality of symbol periods.

According to another aspect of the disclosure, a computer-program product for wireless communication is provided. The computer-program product includes a machine-readable medium encoded with instructions executable to identify a plurality of symbol periods within which symbols representing encoded data are to be transmitted in a plurality of spatial streams over a communication channel; identify a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments and potentially obtain transmit spatial stream diversity benefits, wherein at least two of the pilot tone values in the pilot tone mapping are orthogonal when the symbols are combined over one or more dimensions; and transmit the symbols and the plurality of pilot tones over the plurality of spatial streams for the plurality of symbol periods.

According to another aspect of the disclosure, a wireless communication device is provided. The wireless communication device includes a symbol identifier configured to identify a plurality of symbol periods within which symbols representing encoded data are to be transmitted in a plurality of spatial streams over a communication channel; a pilot tone mapper coupled to the symbol identifier to identify a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments and potentially obtain transmit spatial stream diversity benefits, wherein at least two of the pilot tone values in the pilot tone mapping are orthogonal when the symbols are combined over two dimensions; and a transmitter coupled to the pilot tone mapper to transmit the symbols and the plurality of pilot tones over the plurality of spatial streams for the plurality of symbol periods.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following detailed description. The detailed description and drawings are merely illustrative of the disclosure rather than limiting, the scope of the disclosure being defined by the appended claims and equivalents thereof.

BRIEF DESCRIPTION OF THE DRAWINGS

Aspects according to the disclosure are understood with reference to the following figures, where.

Figure 1:
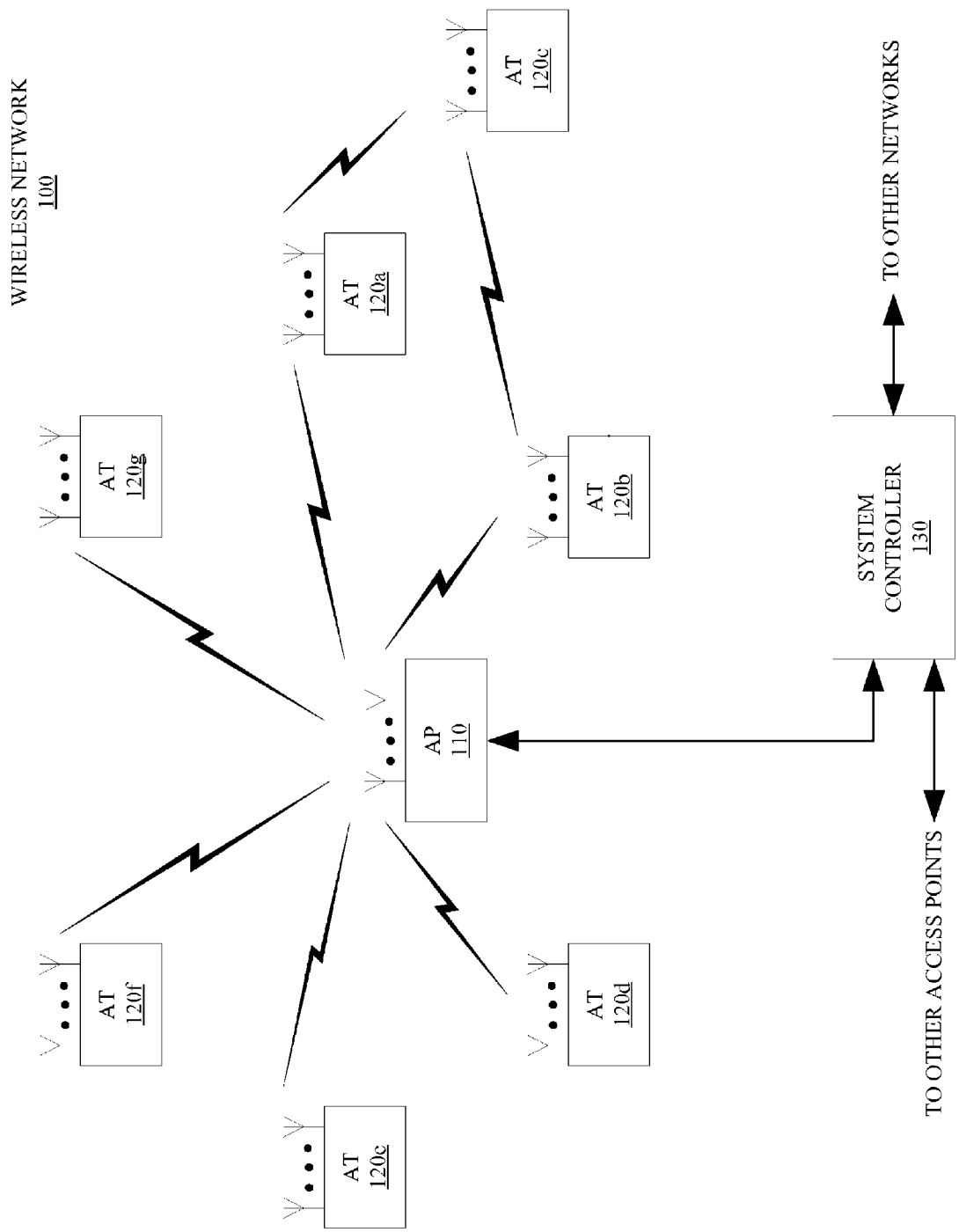
FIG. 1 is a block diagram of a wireless network that may be used with the various aspects of the disclosure contained herein.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the disclosure. It should be understood, however, that the particular aspects shown and described herein are not intended to limit the disclosure to any particular form, but rather, the disclosure is to cover all modifications, equivalents, and alternatives falling within the scope of the disclosure as defined by the claims.

Several aspects of a wireless network will now be presented with reference to FIG. 1. The wireless network 100 is shown with several wireless nodes, generally designated as nodes 110 and 120a-120g. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120a-120g. A system controller 130 may be used to provide coordination and control of the access points, as well as access to other networks (e.g., Internet) for the access terminals 120a-120g. For simplicity, one access point 110 is shown. An access point is generally a fixed terminal that provides backhaul services to access terminals in the geographic region of coverage, however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple ones of the access terminals 120a-120g simultaneously using SDMA. As explained in the background section of this disclosure, SDMA is a multiple access scheme which enables multiple streams transmitted to different receivers at the same time to share the same frequency channel and, as a result, provide higher user capacity. This is achieved by spatially precoding each data stream and then transmitting the spatially precoded streams through the transmit antennas on the downlink. In SDMA and beamforming, the spatial streams, captured in one MIMO vector per subcarrier and per time sample, are multiplied by a weighting/beamforming matrix, resulting in another vector to be transmitted on the transmit antennas. Thus, each spatial stream is spatially expanded and transmitted on all transmit antennas or, in other words, each transmit antenna transmits a weighted sum of the spatial streams. The spatially precoded data streams arrive at the access terminals with different spatial signatures, which enable each access terminal to recover the data stream destined for that access terminal. On the uplink, each one of the access terminals 120a-120g transmits a spatially precoded data stream, which enables the access point 110 to identify the source of each spatially precoded data stream.

One or more access terminals 120a-120g may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard.

Other suitable wireless technologies include, by way of example but not limitation, Code Division Multiple Access (CDMA), Time Division Multiple Access (TDMA), or any other suitable wireless technology or combination of suitable wireless technologies. A CDMA system may implement as being operable under IS-2000, IS-95, IS-856, Wideband-CDMA (WCDMA), or other suitable air interface standards. A TDMA system may implement Global System for Mobile Communications (GSM) or some other suitable air interface standard. As those skilled in the art will readily appreciate, the various aspects of this disclosure are not limited to any particular wireless technology and/or air interface standard.

Figure 2:
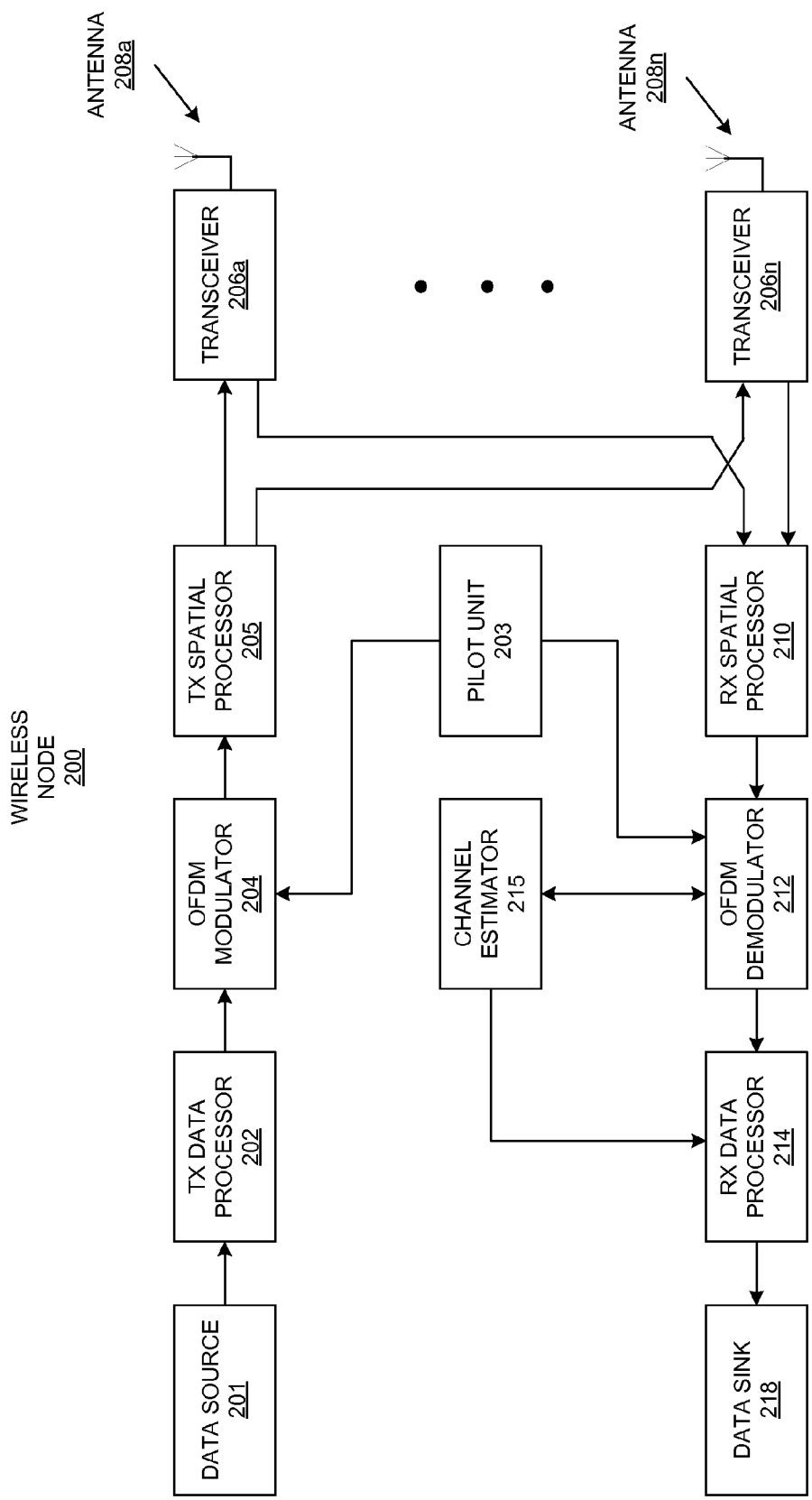
FIG. 2 is a block diagram of a wireless node configured in accordance with various aspects of the disclosure contained herein.

FIG. 2 illustrates a wireless node 200 configured in accordance with the various aspects of the disclosure contained herein that is usable in the wireless network 100. In a transmit mode, a transmit (TX) data processor 202 may be used to receive data from a data source 201 and encode the data to facilitate Forward Error Correction (FEC) at the receiving node. Examples of encoding schemes usable in the TX data processor 202 are convolutional encoding and turbo code encoding schemes. The encoding process results in a sequence of code symbols that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator 204 splits the modulation symbols into a number of parallel streams and then maps each stream to a subcarrier. An Inverse Fast Fourier Transform (IFFT) is then performed on each set of subcarriers to produce time domain OFDM symbols, with each OFDM symbol having a set of subcarriers. The OFDM symbols are distributed in the payloads of multiple data packets.

In at least one configuration of the wireless node 200, at least one pilot signal is carried along with the payload in each data packet. A pilot is typically a non-data-bearing signal generated by a pilot unit 203, employed to enable a receiver to acquire the timing of one or more associated data-bearing (traffic) signal channels, and to provide a phase reference for coherent demodulation of such associated traffic channels. The OFDM modulator 204 splits the pilot signals into a number of parallel streams, and then maps each stream to a subcarrier using some modulation constellation. An IFFT is then performed on each set of subcarriers to produce one or more time domain OFDM symbols which constitutes the pilot signals. The pilot signals are then appended to payload carried by each data packet before providing the respective portion of the data packets to a TX spatial processor 205.

The TX spatial processor 205 performs spatial processing on the data packets. This may be accomplished by spatially precoding the data packets into a number of spatially precoded streams and then providing the spatially precoded streams to the plurality of antennas 208a-208n via a plurality of transceivers 206a-206n. Each transceiver modulates an RF carrier with a respective precoded stream for transmission over the wireless channel.

In a receive mode, each one of a plurality of transceivers 206a-206n receives a signal through its respective antenna. Each transceiver may be used to recover the information modulated onto an RF carrier and provide the information to an RX spatial processor 210.

The RX spatial processor 210 performs spatial processing on the information to recover data packets carried on any spatial streams destined for the wireless node 200. The spatial processing may be performed in accordance with Channel Correlation Matrix Inversion (CCMI), Minimum Mean Square Error (MMSE), Soft Interference Cancellation (SIC), or other suitable techniques.

An OFDM demodulator 212 recovers the data carried on each subcarrier in the OFDM symbols in the payload of the data packet and multiplexes the data into a stream of modulation symbols, including pilot signals. The OFDM demodulator 212 converts the stream from a time-domain to a frequency domain using a Fast Fourier Transfer (FFT). The frequency domain signal includes a separate stream for each subcarrier.

A channel estimator 215 receives the streams that contain the pilot signals from the OFDM demodulator 212 and estimates a channel response. Each pilot signal will be generally shifted in phase due to the transmission through the wireless channel. The MMSE estimates of the phase-shifted pilot signals are computed and these estimates are used to estimate phase errors and consequently the channel response. The channel response is provided to an RX data processor 214. As further explained in FIG. 4, below in WLAN systems, channel estimates may be obtained from using the preamble and the pilot tones to track and characterize the channel, frequency, timing, and/or phase and any offsets.

The RX data processor 214 is used to translate each modulation symbols back to a correct point in the signal constellation. Because of noise and other disturbances in the wireless channel, the modulation symbols may not correspond to an exact location of a point in the original signal constellation. Using the channel response, the RX data processor 214 detects which modulation symbol was most likely transmitted by finding the smallest distance between the received point and the location of a valid symbol in the signal constellation. These soft decisions may be used, in the case of turbo codes, for example, to compute a Log-Likelihood Ratio (LLR) of the code symbols associated with the given modulation symbols. The RX data processor 214 then uses the sequence of code symbol LLRs and the phase error estimates in order to decode the data that was originally transmitted before providing the data to a data sink 218.

Figure 3:
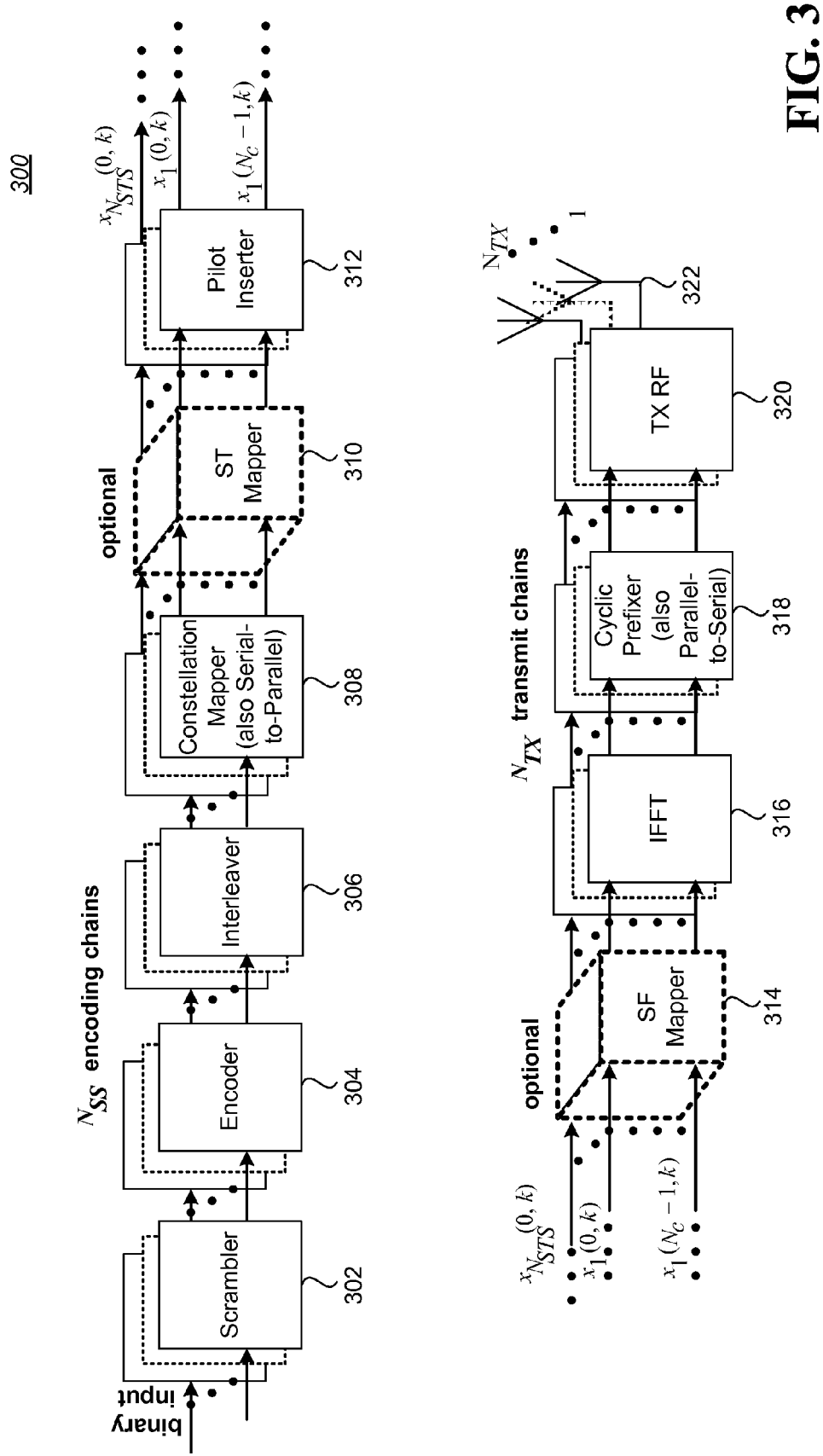
FIG. 3 is a block diagram of a wireless transmitter configured in accordance with various aspects of the disclosure contained herein.

FIG. 3 illustrates a wireless transmitter 300 that might use pilot tone schemes described herein. As shown, the wireless transmitter 300 comprises an encoder 304 with an input for receiving the data to be transmitted to a wireless receiver (or multiple wireless receivers). The encoder 304 might encode data for FEC, encryption, packetization and/or other encodings known for use with wireless transmission after the data has been scrambled by a scrambler 302. An interleaving unit 306 may be used to interleave the encoded data from the encoder 304.

The dimensions illustrated in FIG. 3 represent the various constructs that allow for allocation of data. A given bit or set of bits, which could involve just a grouping of bits or a set of bits that correspond to a constellation point, is mapped to a particular location among the dimensions. In general, the bits and/or signals mapped to different locations among the dimensions are transmitted from the wireless transmitter 300 such that they are expected to be, with some probability, differentiable at a receiver. In an aspect of the disclosure, each spatial stream is transmitted from the wireless transmitter 300 such that the transmissions on different spatial streams are expected to be, with some probability, differentiable at a receiver. The dimensions include a spatial dimension, a frequency dimension, and/or a temporal dimension.

For example, for the spatial dimension, all bits mapped to one spatial dimension are transmitted as one spatial stream. That spatial stream might be transmitted using its own antenna, which is spatially separate from other antennas. Further, that spatial stream may be transmitted using its own orthogonal superposition over a plurality of spatially-separated antennas, its own polarization, etc. Many techniques for spatial stream separation, including those involving separating antennas in space or other techniques that would allow their signals to be distinguished at a receiver, are known and may be used.

In the example shown in FIG. 3, there are $N_{TX}$ spatial streams (shown with that many antennas, but that need not always be the case). Examples of $N_{TX}$ include 2, 3, 4, 10 or other numbers greater than one. In some instances, only one spatial stream may be available because of inactivation of the others, but it should be understood that some benefits of the schemes described herein only accrue with more than one spatial stream.

In an aspect of the disclosure, where the wireless transmitter 300 transmits using a plurality of frequency subcarriers, there are multiple values for the frequency dimension, such that a mapper might map some bits to one frequency subcarrier and other bits to another frequency subcarrier. The frequency subcarriers used for data might be those specified by the IEEE 802.11 standard for data subcarriers. Other frequency subcarriers might be reserved as guard bands, pilot tone subcarriers, or the like that do not (or do not always) carry data. In the example illustrated in FIG. 3, there are $N_c$ subcarriers carrying data or pilot values. Examples of $N_c$ include 52, 56, 104, 114, or other numbers greater than one for OFDM. It is possible to use these techniques for single subcarrier systems, such as by having a space-time pilot mapping, wherein pilot tones and data are time division multiplexed onto the subcarrier, but the bulk of the examples herein assume a plurality of subcarriers used with a space-time-frequency mapping.

The time dimension refers to symbol periods where different bits are allocated to different symbol periods. Where there are multiple spatial streams, multiple subcarriers and multiple symbol periods, a transmission for one symbol period might be referred to as a "MIMO (Multiple-Input, Multiple-Output) OFDM (Orthogonal Frequency Division Multiplexing) symbol". A transmission rate for encoded data might be determined by multiplying the number of bits per simple symbol, $\log_2$ of the number of constellations used, with the number of spatial streams, further with the number of data subcarriers, and divided by the length of the symbol period.

As shown in FIG. 3, separate spatial streams follow separate paths. In some implementations, these $N_{TX}$ paths are implemented with distinct hardware, whereas in other implementations, the path hardware is reused for more than one spatial stream or the path logic is implemented in software that is executed for one or more spatial streams. The elements of each of the spatial streams are shown with reference numbers, with instances of similar elements having the same reference number. However, for simplicity of explanation, one single chain will be used to describe the various aspects disclosed herein.

A constellation mapper 308 maps the data provided into constellations. For example, where Quadrature-Amplitude Modulation (QAM) is used, the constellation mapper 308 may provide four bits per spatial stream, per data subcarrier, per symbol period, and would output a 16-QAM constellation signal for each spatial stream for each data subcarrier for each symbol period to create serial-to-parallel (S/P) data paths. Other modulation schemes such as 64-QAM may be used, which would result in a consumption of six bits per spatial stream, per data subcarrier, per symbol period. Other variations are also possible.

As illustrated, the outputs of the constellation mapper 308 may be spread over spatial-time (ST) dimensions using a ST mapper 310. A plurality of pilot tone inserters 312 inserts pilot tones for the pilot tone subcarriers before they are spread over spatial-frequency (SF) dimensions using a SF mapper 314. In an aspect of the disclosure, the ST mapper 310 and the SF mapper 314 are optional. In another aspect of the disclosure, the ST mapper 310 and the SF mapper 314 are combined in an STF mapper.

The collection of the signals from either the pilot tone inserter 312 or the SF mapper 314 is provided to a plurality of Inverse Fast Fourier Transform (IFFT) units 316 that convert the frequency signals of the data and inserted pilot tones into time domain signals, such as a plurality of signals spread over the spatial streams and time-domain samples for a symbol period k.

The time-domain signals are then processed by a plurality of formatters 318, illustrated as one per spatial stream, which converts the output of the IFFT units 316 to parallel to serial (P/S) signals. In an aspect of the disclosure, the plurality of formatters 318 may also provide cyclical prefixing (i.e., adding a guard interval) and windowing before providing the signals to a plurality of transmitter radio-frequency (TX RF) blocks 320 that output RF signals to a plurality of antennas 322, thereby transmitting the data originally input to the scrambler 302 over a wireless medium suitably configured for reception by wireless receivers.

For MIMO transmissions, transmit diversity gain is a gain at a receiver such that diversity of the transmit streams improves packet error rate (PER) versus signal-to-noise ratio (SNR). Using some of the techniques explained herein, a receiver is better able to characterize the communication channel, transmitter impairments, and/or receiver impairments such as phase noise and frequency offset. Through the improved characterization, the receiver will be better able to decode the transmitted data in the face of distortion of the signal(s) introduced by the communication channel, transmitter impairments, and/or receiver impairments.

Figure 4:
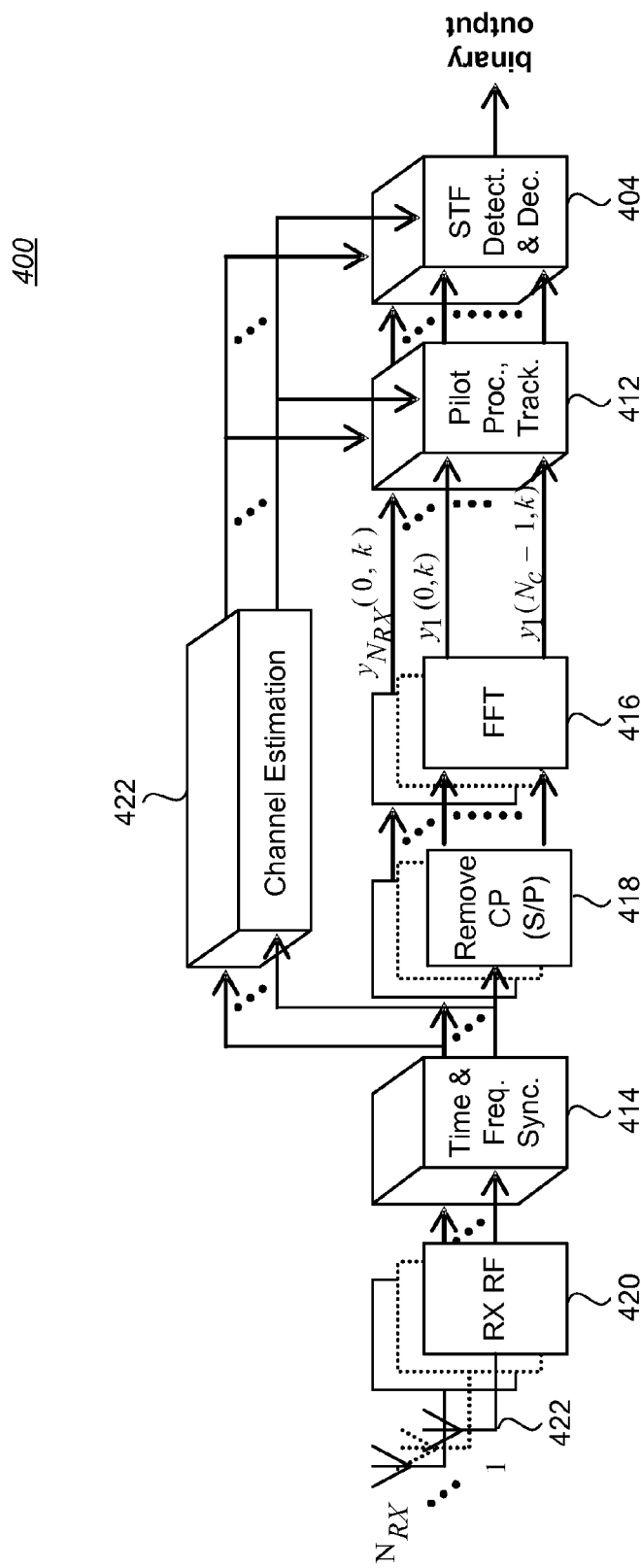
FIG. 4 is a block diagram of a wireless receiver configured in accordance with various aspects of the disclosure contained herein.

FIG. 4 illustrates a wireless receiver 400 that may receive and use signals from a wireless transmitter such as the wireless transmitter 300. Preferably, the wireless receiver 400 is such that it can use pilot tones generated by a wireless transmitter to characterize the channel (variation), transmitter impairments, and/or receiver impairments, and use that characterization to improve reception of data encoded in the transmissions.

As illustrated, the wireless receiver 400 includes a plurality of antennas $N_{RX}$ 422, where $N_{RX}$ refers to the number of receive spatial streams, which can be greater than, less than or equal to $N_{TX}$, the number of transmit spatial streams, that feed received signals to a plurality ($N_{RX}$) of receiver radio-frequency (RX RF) blocks 420. As with the wireless transmitter 300, the number of spatial streams processed need not be equal to the number of antennas and each stream need not be limited to one antenna, as various techniques such as beam steering, orthogonalization or other techniques may be used to arrive at a plurality of receiver streams.

The RX RF blocks 420 output their signals to a synchronization module 414, which provides its output to various elements that perform an inverse function of respective elements described for the wireless transmitter 300. For example, a plurality of deformatters 418, illustrated as one per receive spatial stream, receives the output of the synchronziation module 414, and removes any added prefixes and creates parallel data streams for FFT processing by a plurality of FFT units 416. The plurality of FFT units 416 converts data streams from a time domain to a frequency domain and a pilot tone processor 412 detects any frequency domain signals contained in each receive spatial stream to collectively determine the pilot tones, frequency subcarriers and groups of symbol periods sent by a transmitter. From that, a detector 404 detects and decodes the data over the various dimensions and outputs an estimation by the wireless receiver 400 of what the transmitter sent.

If the wireless receiver 400 is aware of the transmit sequences sent as part of a total information sequence, the wireless receiver 400 can perform channel estimation with the aid of these known transmit sequences (i.e., training sequences). To assist with proper pilot tone tracking, processing, data detection, and decoding, a channel estimation module 430 provides estimation signals to the pilot tone processor 412 and the detector 404 based on results from the synchronization module 414 or, if the deformatting and FFT is the same for the known transmit sequences as for the data portion of the total information sequence, based on results from the plurality of FFT units 416.

Figure 5:
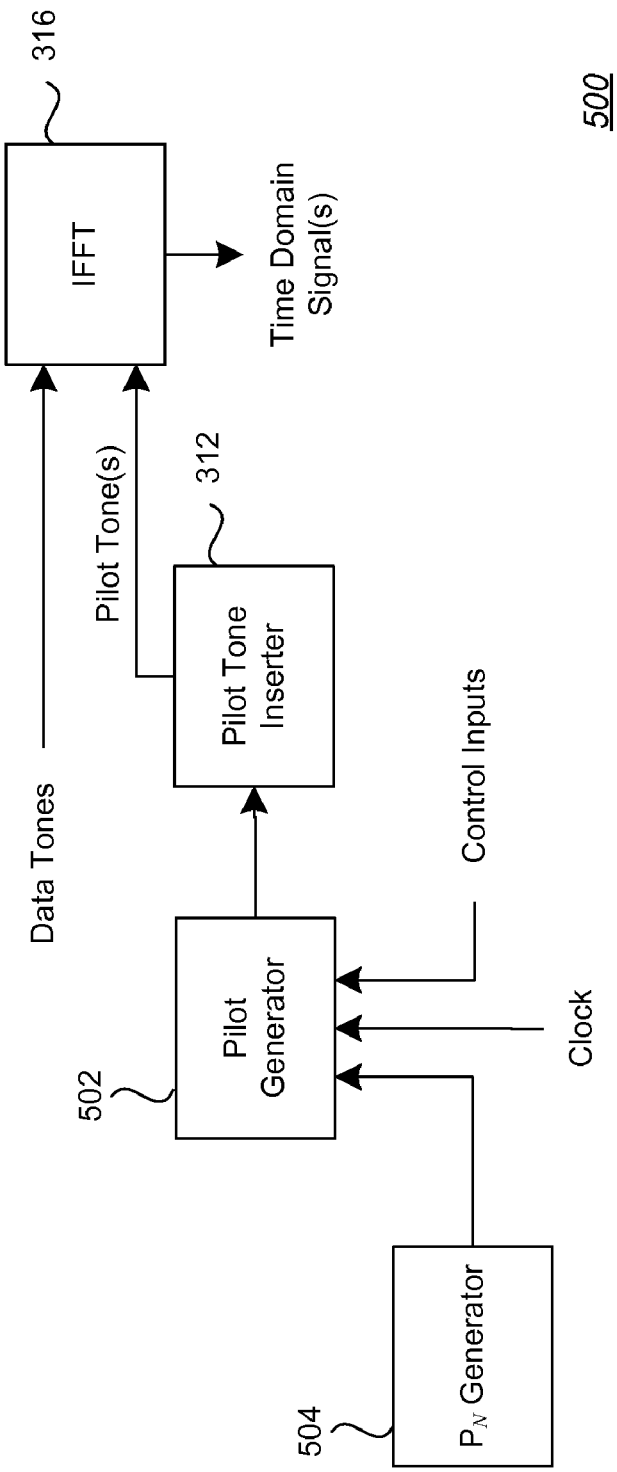
FIG. 5 is a block diagram of a portion of the transmitter of FIG. 3, shown in greater detail.

FIG. 5 illustrates an example of a detailed portion 500 of a wireless transmitter that may be implemented in the wireless transmitter 300. As explained above, data tones, such as that provided by the mapper or the like, and pilot tones, from a pilot tone inserter 312, may be provided to an IFFT unit such as the IFFT unit 316. The data tones and the pilot tones, which occupy different frequency subcarriers, are applied to different taps of the IFFT unit 316 to create an appropriate time-domain signal. In this example, the particular pilot tones that are inserted by the pilot tone inserter 312 are driven by a pilot tone generator 502. The pilot tone generator 502 determines the amplitude (and possibly the phase) of pilot tones for each spatial stream, each pilot tone (where the transmitter provides for a plurality of pilot tone subcarriers) and for each symbol period.

The values of the pilot tones can be derived from control signals and possibly also a pseudorandom number (PN) generator 504. Thus, in a symbol period, the pilot generator 502 would specify an amplitude (and possibly a phase) for each of one or more pilot tones over a plurality of spatial streams. The amplitude might be zero in some cases, meaning that a particular pilot tone for a particular spatial stream might not be transmitted. A set of pilot tone values over a sequence of symbol periods is referred to herein as a pilot tone sequence. In an aspect of the disclosure, the pilot tone value for a given spatial stream and pilot subcarrier is considered constant over a symbol period and may or may not change from one particular symbol period to the next. In such approaches, the values might be referred to as "pilot symbols". Thus, a pilot generator might comprise logic to determine, for a plurality of spatial streams and a plurality of pilot tone subcarriers, which pilot tone symbols to provide for those streams and subcarriers each symbol period.

Various approaches for determining the pilot tone sequences are described herein, and below in particular. By using a distinguishable set of pilot sequences as inserted by the pilot tone inserter 512, such impairments as phase noise and offset, frequency offset, timing drift, amplitude fluctuation, channel variation, and/or other possible impairments can be separately estimated for each spatial stream. In particular, an orthogonal set of vectors in time can be applied onto multiple spatial streams to distinguish between the different spatial streams and, as such, be able to benefit from spatial stream diversity, while distributing power over the various spatial streams. In particular, the orthogonal set of vectors in time can be applied onto multiple transmitter antennas to distinguish between the different antennas. In an aspect of the disclosure, having power distributed equally among them.

The various aspects disclosed herein utilize an orthogonal pilot tone mapping. Without loss of generality, MIMO or SDMA applications in combination with OFDM will be used to describe the various aspects of the disclosure. In the described example, the pilot tone mapping is orthogonal in the spatial domain, which could be beneficial in such applications as SDMA applications because orthogonality over space allows for tracking of the system impairments and anomalies of the spatial streams independently. Other pilot tone mappings may be created based on the description contained herein that are orthogonal and that includes one or more other dimensions, such as time and frequency.

Assume a symbol on the k-th subcarrier of the n-th OFDM symbol and the $i_{STS}$-th space-time stream is denoted by:

$$x_{(i_{STS},n)}^{k}. \qquad (1)$$

Then, if for the n-th OFDM symbol and $i_{STS}$-th space-time stream the k-th subcarrier is a pilot tone, a pilot tone mapping in an aspect of the disclosure is represented by:

$$x_{(i_{STS},n)}^{k}=p_{n+z}m_{n}^{k}s_{(i_{STS},n)}^{k}, \qquad (2)$$

where:

n: is an OFDM symbol index, which begins with 0, following the IEEE 802.11n notation as in Section 20 of the Draft 6.0 standard in an aspect of the disclosure contained herein;

z: is a constant that, in an aspect of the disclosure contained herein, depends on the number of signal fields in the preamble;

$p_x$: is a pseudo random sequence such as that provided in Section 17.3.5.9 of the IEEE 802.11-2007 standard in an aspect of the disclosure contained herein;

$m_n^k$: is a time-frequency pilot tone mapping for a pilot tone with subcarrier index k of the n-th OFDM symbol; and, $s_{(i_{STS},n)}^k$: corresponds to an element of an overlaying orthogonal code, such that orthogonality is achieved in the spatial dimension.

Examples are provided herein to further illustrate the various approaches of the orthogonal pilot tone mapping proposed by the disclosure. These examples are not to be limiting, but are used to illustrate the concepts disclosed herein. In one example, consider a time-frequency pilot tone mapping $m_n^k$ that covers four pilot tones and repeats every 4 OFDM symbols. Without loss of generality, it is assumed that the pilot tone indices k are −26, −7, 7, and 26. An example of such a pilot tone mapping $m_n^k$ is illustrated in the following table:

TABLE 1

Pilot Tone Mapping for 4 Pilot Tones & 4 OFDM Symbols

| | k | | | |
|---|---|---|---|---|
| n mod 4 | −26 | −7 | 7 | 26 |
| 0 | 1 | 1 | 1 | −1 |
| 1 | 1 | 1 | −1 | 1 |
| 2 | 1 | −1 | 1 | 1 |
| 3 | −1 | 1 | 1 | 1 |

In this example, an overlaying code of at least 16 elements is required to generate up to 16 independent time-frequency mappings. An example of such a code is given by the rows of the 16×16 Hadamard matrix, $H_{16}$, such that $s_{(i_{STS},n)}^k$ equals the $(i_{STS}, 4(n \bmod 4)+q)$-th element of $H_{16}$:

$$s_{(i_{STS},n)}^k = H_{16}(i_{STS}, 4(n \bmod 4)+q), \quad (3)$$

where, $$q = \{1, 2, 3, 4\} \text{ for } k = \{-26, -7, 7, 26\}, \text{ respectively,} \quad (4)$$

and

Ignoring the pseudorandom sequence $p_{n+z}$, the following pilot tone mapping are derived for the first four spatial streams where, for spatial stream 1:

TABLE 2

Pilot Tone Mapping for Spatial Stream 1

| | k | | | |
|---|---|---|---|---|
| n mod 4 | −26 | −7 | 7 | 26 |
| 0 | 1 | 1 | 1 | −1 |
| 1 | 1 | 1 | −1 | 1 |
| 2 | 1 | −1 | 1 | 1 |
| 3 | −1 | 1 | 1 | 1 |

For spatial stream 2:

TABLE 3

Pilot Tone Mapping for Spatial Stream 2

| | k | | | |
|---|---|---|---|---|
| n mod 4 | −26 | −7 | 7 | 26 |
| 0 | 1 | −1 | 1 | 1 |
| 1 | 1 | −1 | −1 | −1 |
| 2 | 1 | 1 | 1 | −1 |
| 3 | −1 | −1 | 1 | −1 |

$$H_{16} = \quad (5)$$

$$\begin{pmatrix}
1 & 1 & 1 & 1 & 1 & 1 & 1 & 1 & 1 & 1 & 1 & 1 & 1 & 1 & 1 & 1 \\
1 & -1 & 1 & -1 & 1 & -1 & 1 & -1 & 1 & -1 & 1 & -1 & 1 & -1 & 1 & -1 \\
1 & 1 & -1 & -1 & 1 & 1 & -1 & -1 & 1 & 1 & -1 & -1 & 1 & 1 & -1 & -1 \\
1 & -1 & -1 & 1 & 1 & -1 & -1 & 1 & 1 & -1 & -1 & 1 & 1 & -1 & -1 & 1 \\
1 & 1 & 1 & 1 & -1 & -1 & -1 & -1 & 1 & 1 & 1 & 1 & -1 & -1 & -1 & -1 \\
1 & -1 & 1 & -1 & -1 & 1 & -1 & 1 & 1 & -1 & 1 & -1 & -1 & 1 & -1 & 1 \\
1 & 1 & -1 & -1 & -1 & -1 & 1 & 1 & 1 & 1 & -1 & -1 & -1 & -1 & 1 & 1 \\
1 & -1 & -1 & 1 & -1 & 1 & 1 & -1 & 1 & -1 & -1 & 1 & -1 & 1 & 1 & -1 \\
1 & 1 & 1 & 1 & 1 & 1 & 1 & 1 & -1 & -1 & -1 & -1 & -1 & -1 & -1 & -1 \\
1 & -1 & 1 & -1 & 1 & -1 & 1 & -1 & -1 & 1 & -1 & 1 & -1 & 1 & -1 & 1 \\
1 & 1 & -1 & -1 & 1 & 1 & -1 & -1 & -1 & -1 & 1 & 1 & -1 & -1 & 1 & 1 \\
1 & -1 & -1 & 1 & 1 & -1 & -1 & 1 & -1 & 1 & 1 & -1 & -1 & 1 & 1 & -1 \\
1 & 1 & 1 & 1 & -1 & -1 & -1 & -1 & -1 & -1 & -1 & -1 & 1 & 1 & 1 & 1 \\
1 & -1 & 1 & -1 & -1 & 1 & -1 & 1 & -1 & 1 & -1 & 1 & 1 & -1 & 1 & -1 \\
1 & 1 & -1 & -1 & -1 & -1 & 1 & 1 & -1 & -1 & 1 & 1 & 1 & 1 & -1 & -1 \\
1 & -1 & -1 & 1 & -1 & 1 & 1 & -1 & -1 & 1 & 1 & -1 & 1 & -1 & -1 & 1
\end{pmatrix}$$

For spatial stream 3:

TABLE 4

Pilot Tone Mapping for Spatial Stream 3

| | k | | | |
|---|---|---|---|---|
| n mod 4 | −26 | −7 | 7 | 26 |
| 0 | 1 | 1 | −1 | 1 |
| 1 | 1 | 1 | 1 | −1 |
| 2 | 1 | −1 | −1 | −1 |
| 3 | −1 | 1 | −1 | −1 |

For spatial stream 4:

TABLE 5

Pilot Tone Mapping for Spatial Stream 4

| | k | | | |
|---|---|---|---|---|
| n mod 4 | −26 | −7 | 7 | 26 |
| 0 | 1 | −1 | −1 | −1 |
| 1 | 1 | −1 | 1 | 1 |
| 2 | 1 | 1 | −1 | 1 |
| 3 | −1 | −1 | −1 | 1 |

In this particular example, if only 1 to 4 spatial streams are used, the pilot mapping is orthogonal over space for every OFDM symbol when correlating over the frequency domain—that is, the pilot tone subcarriers. For 5 to 8 spatial streams, this pilot tone mapping is orthogonal over space when considering the time-frequency mapping of every two subsequent OFDM symbols. Finally, for 8 to 16 spatial streams, this mapping is orthogonal in the spatial dimension when combining 4 subsequent OFDM symbols.

In another example, a time-frequency pilot tone mapping $m_n^k$ that covers six pilot tones and repeats every 4 OFDM symbols is provided. Without loss of generality, it is assumed that the pilot tone indices are −53, −25, −11, 11, 25, and 53. An example of such a pilot tone mapping, $m_n^k$, is illustrated as:

TABLE 6

Pilot Tone Mapping for 6 Pilot Tones & 4 OFDM Symbols

| | k | | | | | |
|---|---|---|---|---|---|---|
| n mod 4 | −53 | −25 | −11 | 11 | 25 | 53 |
| 0 | 1 | 1 | 1 | −1 | −1 | 1 |
| 1 | 1 | 1 | −1 | −1 | 1 | 1 |
| 2 | 1 | −1 | −1 | 1 | 1 | 1 |
| 3 | −1 | −1 | 1 | 1 | 1 | 1 |

To generate at least 16 orthogonal time-frequency pilot tone mappings from this basic mapping, the rows of the 24×24 Hadamard matrix $H_{24}$ can be used as an overlaying orthogonal code.

In another example, a time-frequency pilot tone mapping for 6 pilot tones that repeats every 6 OFDM symbol, and uses as overlaying orthogonal code the rows of the 36×36 Hadamard matrix $H_{36}$ may be used.

It should be understood that the various aspects of the disclosure are not limited to the particular receiver implementations shown herein. In a number of examples, novel apparatus and methods are shown implemented with elements common and widespread in wireless systems today. However, it should be understood that the teachings of this disclosure are applicable to other existing, and later developed elements as well, unless indicated otherwise. For example, other values for the pilot tones symbols can be used other than 1 and −1 values, i.e., other phases and even other amplitudes might be used. Instead of matrices driving the sequences, equations or sequences (complex or real) can be used as inputs to a pilot tone generator to generate orthogonal or semi-orthogonal SF, ST, or STF mappings. The pilot tones can be QAM constellation points or non-QAM constellation points, inputs, etc.

Figure 6:
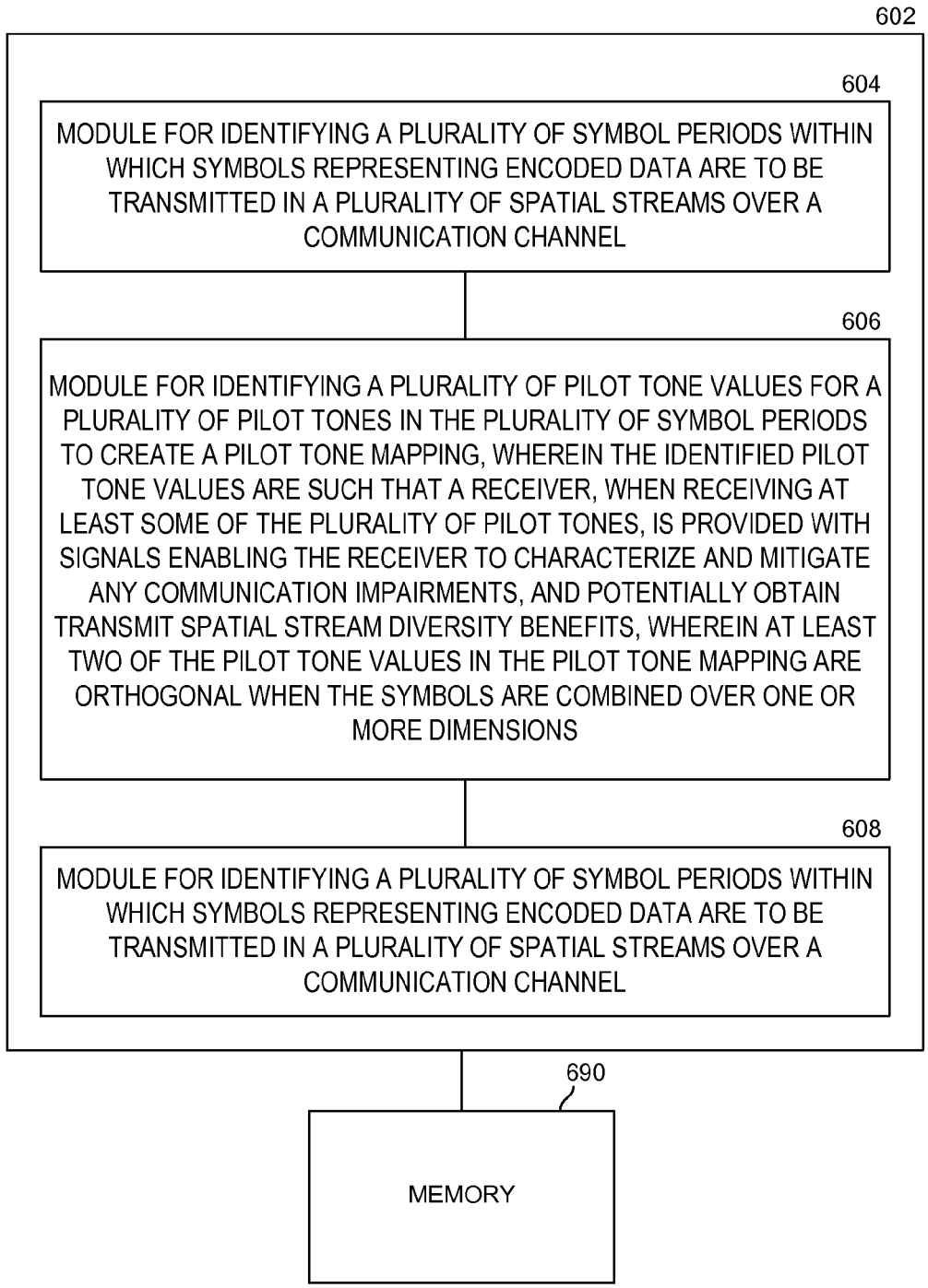
FIG. 6 is an illustration of an example system for a wireless communication device that provides orthogonal pilot tone mapping in MIMO and SDMA systems, configured in accordance to one aspect of the disclosure.

FIG. 6 illustrates a system 600 of a wireless communication device for orthogonal pilot tone mapping in MIMO and SDMA systems. As depicted, the system 600 includes functional blocks that can represent functions implemented by a processor, software, or combination thereof (e.g., firmware). The system 600 includes a logical grouping 602 of electrical components that facilitate use of benefits of transmit spatial stream diversity. Logical grouping 602 can include a module for identifying a plurality of symbol periods within which symbols representing encoded data are to be transmitted in a plurality of spatial streams over a communication channel 604. Moreover, logical grouping 602 can include a module for identifying a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments and potentially obtain transmit spatial stream diversity benefits, wherein at least two of the pilot tone values in the pilot tone mapping are orthogonal when the symbols are combined over one or more dimensions 606. Furthermore, logical grouping 602 can include a module for identifying a plurality of symbol periods within which symbols representing encoded data are to be transmitted in a plurality of spatial streams over a communication channel 608. Additionally, the system 600 can include a memory 690 that retains instructions for executing functions associated with electrical components 604, 606, and 608. While shown as being external to memory 690, it is to be understood that electrical components 604, 606, and 608 can exist within memory 690.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the various aspects of the disclosure. Various modifications to these examples will be readily apparent to those skilled in the art, and the generic principles defined herein may be applied to other examples without departing from the spirit or scope of the invention. Thus, the present disclosure is not intended to be limited to the examples shown herein but is to be accorded the widest scope consistent with the principles and novel features disclosed herein.

What is claimed is:

1. A method for wireless communication, comprising:
   identifying a plurality of symbol periods within which symbols representing encoded data are to be transmitted in a plurality of spatial streams over a communication channel;
   identifying a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments, wherein at least two of the pilot tone values in the pilot tone mapping are orthogonal when the symbols are combined over one or more dimensions;
   overlaying the pilot tone mapping with an orthogonal code to achieve orthogonality in a plurality of dimensions; and
   transmitting the symbols and the plurality of pilot tones over the plurality of spatial streams for the plurality of symbol periods.

2. The method of claim 1, wherein the one or more dimensions are chosen from a set consisting of a space dimension, a time dimension, and a frequency dimension.

3. The method of claim 1, wherein the orthogonal pilot tone mapping is added to a plurality of OFDM symbols.

4. The method of claim 3, wherein the orthogonal pilot tone mapping is added to fixed subcarriers of the plurality of OFDM symbols.

5. The method of claim 3, further comprising altering the pilot tone mapping with a sequence longer than the pilot tone mapping to create a pattern of orthogonal pilot tone mapping that has a longer repetition period than the pilot tone mapping.

6. The method of claim 5, wherein the sequence is a pseudo random sequence, such as given in Section 17.3.5.9 of the IEEE 802.11 standard.

7. The method of claim 1, wherein the orthogonal code is obtained by taking one entry from one of a row and a column of a Hadamard matrix.

8. The method of claim 1, wherein the orthogonal pilot tone mapping is repeated every predetermined plurality of symbols in a packet.

9. A communication apparatus, comprising:
   means for identifying a plurality of symbol periods within which symbols representing encoded data are to be transmitted in a plurality of spatial streams over a communication channel;
   means for identifying a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments, wherein at least two of the pilot tone values in the pilot tone mapping are orthogonal when the symbols are combined over one or more dimensions;
   means for overlaying the pilot tone mapping with an orthogonal code to achieve orthogonality in a plurality of dimensions; and
   means for transmitting the symbols and the plurality of pilot tones over the plurality of spatial streams for the plurality of symbol periods.

10. The communication apparatus of claim 9, wherein the one or more dimensions are chosen from a set consisting of a space dimension, a time dimension, and a frequency dimension.

11. The communication apparatus of claim 9, wherein the orthogonal pilot tone mapping is added to a plurality of OFDM symbols.

12. The communication apparatus of claim 11, wherein the orthogonal pilot tone mapping is added to fixed subcarriers of the plurality of OFDM symbols.

13. The communication apparatus of claim 11, further comprising a means for altering the pilot tone mapping with a sequence longer than the pilot tone mapping to create a pattern of orthogonal pilot tone mapping that has a longer repetition period than the pilot tone mapping.

14. The communication apparatus of claim 13, wherein the sequence is a pseudo random sequence, such as given in Section 17.3.5.9 of the IEEE 802.11 standard.

15. The communication apparatus of claim 9, wherein the orthogonal code is obtained by taking one entry from one of a row and a column of a Hadamard matrix.

16. The communication apparatus of claim 9, wherein the orthogonal pilot tone mapping is repeated every predetermined plurality of symbols in a packet.

17. An apparatus for communications, comprising:
a processing system configured to:
identify a plurality of symbol periods within which symbols representing encoded data are to be transmitted in a plurality of spatial streams over a communication channel;
identify a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments, wherein at least two of the pilot tone values in the pilot tone mapping are orthogonal when the symbols are combined over one or more dimensions;
overlay the pilot tone mapping with an orthogonal code to achieve orthogonality in a plurality of dimensions; and
transmit the symbols and the plurality of pilot tones over the plurality of spatial streams for the plurality of symbol periods.

18. The communication apparatus of claim 17, wherein the one or more dimensions are chosen from a set consisting of a space dimension, a time dimension, and a frequency dimension.

19. The communication apparatus of claim 17, wherein the orthogonal pilot tone mapping is added to a plurality of OFDM symbols.

20. The communication apparatus of claim 19, wherein the orthogonal pilot tone mapping is added to fixed subcarriers of the plurality of OFDM symbols.

21. The communication apparatus of claim 17, wherein the orthogonal code is obtained by taking one entry from one of a row and a column of a Hadamard matrix.

22. The communication apparatus of claim 17, wherein the orthogonal pilot tone mapping is repeated every predetermined plurality of symbols in a packet.

23. The communication apparatus of claim 22, wherein the processing system is further configured to alter the pilot tone mapping with a sequence longer than the pilot tone mapping to create a pattern of orthogonal pilot tone mapping that has a longer repetition period than the pilot tone mapping.

24. The communication apparatus of claim 23, wherein the sequence is a pseudo random sequence, such as given in Section 17.3.5.9 of the IEEE 802.11 standard.

25. A computer-program product for wireless communications, comprising:
a machine-readable medium encoded with instructions executable to:
identify a plurality of symbol periods within which symbols representing encoded data are to be transmitted in a plurality of spatial streams over a communication channel;
identify a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments, wherein at least two of the pilot tone values in the pilot tone mapping are orthogonal when the symbols are combined over one or more dimensions;
overlay the pilot tone mapping with an orthogonal code to achieve orthogonality in a plurality of dimensions; and
transmit the symbols and the plurality of pilot tones over the plurality of spatial streams for the plurality of symbol periods.

26. A wireless communications device comprising:
a symbol identifier configured to identify a plurality of symbol periods within which symbols representing encoded data are to be transmitted in a plurality of spatial streams over a communication channel;
a pilot tone mapper coupled to the symbol identifier to identify a plurality of pilot tone values for a plurality of pilot tones in the plurality of symbol periods to create a pilot tone mapping, wherein the identified pilot tone values are such that a receiver, when receiving at least some of the plurality of pilot tones, is provided with signals enabling the receiver to characterize and mitigate any communication impairments, wherein at least two of the pilot tone values in the pilot tone mapping are orthogonal when the symbols are combined over one or more dimensions;
a pilot tone overlayer coupled to the pilot tone mapper to overlay the pilot tone mapping with an orthogonal code to achieve orthogonality in a plurality of dimensions; and
a transmitter coupled to the pilot tone overlayer to transmit the symbols and the plurality of pilot tones over the plurality of spatial streams for the plurality of symbol periods.

* * * * *